July 4, 1950 W. C. MOELLER 2,513,507
EYESHIELD TEMPLE CONNECTION
Filed Oct. 7, 1946
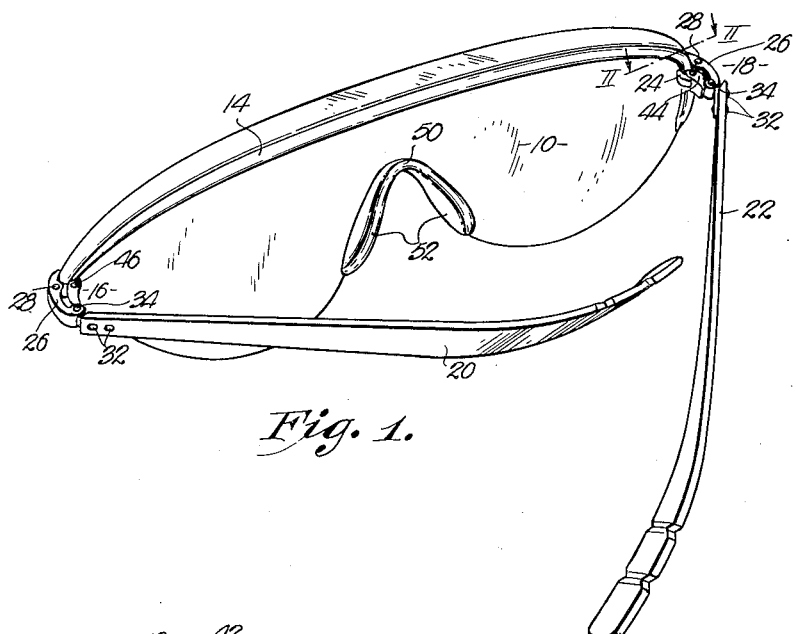
Fig. 1.
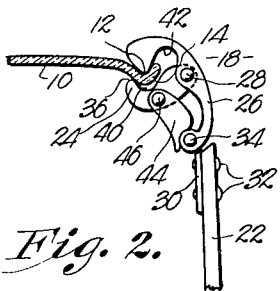
Fig. 2.
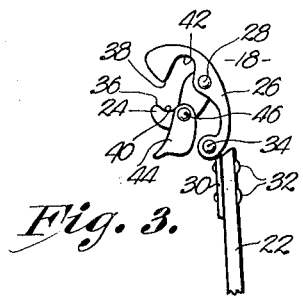
Fig. 3.
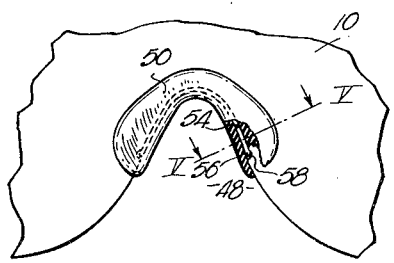
Fig. 4.
Fig. 5.
INVENTOR.
William C. Moeller
ATTORNEY.

Patented July 4, 1950

2,513,507

UNITED STATES PATENT OFFICE 2,513,507

EYESHIELD TEMPLE CONNECTION

William C. Moeller, Kansas City, Mo., assignor to A. F. Parmalee, doing business as United States Safety Service Co., Kansas City, Mo.

Application October 7, 1946, Serial No. 701,638

3 Claims. (Cl. 2—14)

This invention has to do with devices for aiding vision or protecting the eyes against glare, dust or the like and more particularly to spectacles of the kind having an eye shield provided with a nose bridge and side pieces or bows for passing over the ears.

The primary aim of this invention is to provide an eye shield having readily detachable means for mounting the side bows on the eye-covering body of the shield, including a pair of jaws fixed to each bow and movable toward and from each other for clamping the shield therebetween.

An important object of this invention is to provide clamping means for attaching the bows of spectacles to the eye shield formed by a jaw secured to the bow and a second jaw pivotally mounted thereto; and the additional provision of a swingable dog on the second jaw disposed and formed to be wedged between the jaws for holding the same in gripping relation to the shield.

A further object of this invention is to provide in an eye shield having the aforesaid clamping means, a cooperating ridge and groove structure along each end of the eye covering body thereof for receiving the said jaws in any desired position therealong, which object includes the structural formation of the jaws to conform to the contour of the ridges and grooves.

A still further object of this invention is to provide an eye shield having a bridge provided with a specially designed nose piece, formed from pliable material and having a resilient member therein for holding the same in place through the medium of notches formed in the shield at said bridge.

Other objects will be made clear during the course of the following specification, referring to the accompanying drawing, wherein:

Fig. 1 is a perspective view of an eye shield made in accordance with my present invention.

Fig. 2 is an enlarged fragmentary detailed view taken on line II—II of Fig. 1.

Fig 3 is a detailed view of one of the clamping elements entirely removed from association with the eye-covering body and showing the jaws thereof open.

Fig. 4 is a detailed fragmentary view of the nose piece, parts being broken away to reveal details of construction; and Fig. 5 is a cross-sectional view taken on line V—V of Fig. 4.

The eye covering portion or lens structure of the spectacles chosen for illustration takes the form of a unitary body 10, particularly useful as protecting goggles. It is contemplated however, that any form of covering, such as the conventional two-piece lens structure of ground glass may be used as well as the plastic material shown in the drawing, when formed to present a groove and bead or ridge 12 and 14 respectively.

The bead 14 extends the entire length of body 10 along the inner, marginal edge thereof and near its normally top edge to rest against the forehead of the wearer when placed in use, while the groove 12 is in opposed relation thereto on the outer face of body 10. Bead 14, and groove 12 also extend downwardly along a portion of the ends of body 10 to receive respective clamping elements 16 and 18.

These elements 16 and 18 are identical, each mounting one of the side members or bows 20 or 22, therefore only one will be described in detail, referring particularly to Figs. 2 and 3.

A pair of jaws 24 and 26 are pivotally joined as at 28 and attached to the respective bow 20 or 22 through the medium of a bracket 30. This bracket 30 is rigidly attached to bow 20 or 22 by pins 32 and jaw 26 is hingedly mounted thereto as at 34.

The free ends of the jaws 24 and 26 terminate in an extended tongue as at 36 and 38 respectively, the portions thereof between said tongues and the opposite, or pivoted ends thereof, being curved inwardly as at 40 and 42.

It is clear therefore, that as jaws 24 and 26 are moved together on pivot 28 to a position where body 10 is clamped therebetween as seen in Fig. 2, the tongue and internally curved portions thereof will conform to the contours of groove 12 and bead 14. In other words, tongue 38 of jaw 26 is seated in groove 12, while ridge 14 fits into the curved portion 40 of jaw 24. The outermost edge of body 10 forming groove 12 and ridge 14 terminates within curved portion 42 of jaw 26.

When jaws 24 and 26 are moved to the closed position, a dog 44 swingably mounted on jaw 24 as at 46 is moved to a wedging position where the free end thereof engages jaw 26. That portion of jaw 26 encircling pivot pin 34 is substantially circular as shown and the free end of dog 44 is arched to present a frictional engagement whereby the jaws are positively locked against movement.

The bows 20 and 22 and body 10 may be easily and quickly adjusted with respect to their relative positions by simply disengaging dog 44 and slipping the jaws 24 and 26 upwardly or downwardly along the edge of body 10 to a position that is comfortable and best suited to the size and shape of the face of the wearer.

In this connection, provision has also been made to provide an adjustable nose piece for the spectacles. Body 10 is formed to present a bridge generally designated by the numeral 48, which is of the usual inwardly cut out portion, midway between the ends of body 10 and curved generally to fit the nose. A nose piece 50 is preferably formed from pliable plastic or like material capable of readily conforming to the contour of the nose, as well as to the contour of bridge 48. Laterally projecting pads 52 rest against the sides of the nose when worn in the usual manner.

The inner edge of nose piece 50 is overlapped as at 52 for receiving the edges of body 10 forming bridge 48, as is clear in Fig. 5, and when the nose piece 50 is formed, a substantially U-shaped member 54 is molded therein. This member is made from resilient material and in such manner as to tend to move outwardly at the free ends thereof in engagement with the edges of bridge 48. These free ends 56 extend beyond the nose piece 50 and are offset to enter a respective notch 58 in body 10 when assembled.

Pressing together of the ends 56 of member 54 will move the same from notches 58 for replacement of nose piece 50 when desired, or for remolding the same to more properly fit the nose of the wearer as desired.

Through the medium of these two adjustable features, namely, elements 16 and 18 and nose piece 50, it is possible for anyone needing such devices to reset and reshape the spectacles to fit irrespective of any peculiar conditions that may exist either in the contour of his face or the working conditions with which he is associated.

Although only one modification of the instant invention has been shown and described, it is understood that eye shields may be made without departing from the spirit of the invention or scope of the appended claims.

Having thus described the invention, what is claimed as new and desired to be secured by Letters Patent is:

1. Releasable structure for attaching a temple member to a lens of a pair of spectacles, said structure comprising a pair of links having jaws adapted to receive a portion of said lens therebetween, one of the links being pivotally secured at one end thereof to the other of said links intermediate the ends of the latter; means for attaching said temple member to said other link; and a detent interposed between the links for holding the same clamped against said lens, one end of the detent engaging the one link intermediate the ends of the latter.

2. Releasable structure for attaching a temple member to a lens of a pair of spectacles, said structure comprising a pair of links having jaws adapted to receive a portion of said lens therebetween, one of the links being pivotally secured at one end thereof to the other of said links intermediate the ends of the latter; means for attaching said temple member to said other link; and a detent interposed between the links for holding the same clamped against said lens, one end of the detent being pivotally secured to the one link between the jaw thereof and its said one end.

3. Releasable structure for attaching a temple member to a lens of a pair of spectacles, said structure comprising a pair of links, one of said links being pivotally secured at one end thereof to the other of said links intermediate the ends of the latter; a jaw formed on the opposite end of said one link; a second jaw formed on one end of the other link; means for attaching said temple member to the opposite end of said other link; and a detent pivotally secured to the one link intermediate the ends of the latter, said opposite end of the other link being formed to receive the free end of said detent for holding the jaws in an operative position with a portion of said lens clamped therebetween.

WILLIAM C. MOELLER.

REFERENCES CITED

The following references are of record in the file of this patent:

UNITED STATES PATENTS

| Number | Name | Date |
|---|---|---|
| 600,496 | Meyrowitz | Mar. 8, 1898 |
| 707,109 | Hirst | Aug. 19, 1902 |
| 869,880 | Conrad | Nov. 5, 1907 |
| 875,006 | Smith | Dec. 31, 1907 |
| 1,011,959 | Ingold | Dec. 19, 1911 |
| 1,145,058 | Day | July 6, 1915 |
| 1,965,025 | Bauer | July 3, 1934 |
| 2,397,243 | Cooper, Jr. | Mar. 26, 1946 |

FOREIGN PATENTS

| Number | Country | Date |
|---|---|---|
| 133,008 | Great Britain | Oct. 2, 1919 |